United States Patent [19]

Hendry

[11] 4,390,332
[45] Jun. 28, 1983

[54] APPARATUS FOR INJECTION MOLDING OF PARTS FROM FOAM PLASTICS MATERIAL AND/OR FROM SOLID PLASTICS MATERIAL

[75] Inventor: James W. Hendry, Englewood, Tenn.

[73] Assignee: KMMCO Structural Foam, Inc., East Detroit, Mich.

[21] Appl. No.: 280,598

[22] Filed: Jul. 6, 1981

[51] Int. Cl.³ .............. B29D 27/00; B29F 1/05; B29F 1/10

[52] U.S. Cl. .................. 425/4 R; 264/40.4; 264/50; 264/53; 264/54; 264/328.8; 264/328.19; 264/DIG. 83; 425/147; 425/560; 425/570; 425/572; 425/573; 425/817 R

[58] Field of Search .............. 425/572, 560, 557, 4 R, 425/4 C, 129, 147, 570, 573, 817 R; 264/328.8, 328.19, 50, 53, DIG. 83, 40.4, 54

[56] References Cited

U.S. PATENT DOCUMENTS

| | | | |
|---|---|---|---|
| 2,848,739 | 8/1958 | Henning | 264/53 |
| 2,928,130 | 3/1960 | Gray | 264/50 |
| 3,287,477 | 11/1966 | Vesilind | 264/53 |
| 3,353,209 | 11/1967 | Schad | 264/328.19 X |
| 3,417,433 | 12/1968 | Teraoka | 264/328.8 X |
| 3,451,103 | 6/1969 | Aykanian et al. | 264/53 X |
| 3,461,498 | 8/1969 | Ramaika | 264/53 X |
| 3,466,700 | 9/1969 | Harrison | 425/129 |
| 3,516,123 | 6/1970 | Lang et al. | 264/328.19 X |
| 3,793,416 | 2/1974 | Finkmann et al. | 264/53 |
| 3,830,901 | 8/1974 | Winstead | 264/53 X |
| 3,843,295 | 10/1974 | Greenberg et al. | 425/572 X |
| 3,891,362 | 6/1975 | DeVita | 264/DIG. 83 |
| 3,902,704 | 9/1975 | Ishibashi et al. | 264/53 X |
| 3,940,467 | 2/1976 | Brachman | 264/53 X |
| 3,983,196 | 9/1976 | Gray | 264/54 X |
| 4,043,715 | 8/1977 | Hendry | 425/4 R |
| 4,124,308 | 11/1978 | Sokolow | 425/557 X |

FOREIGN PATENT DOCUMENTS 2158204 11/1971 Fed. Rep. of Germany ...... 425/560
2301377 10/1976 France ............................. 425/560

Primary Examiner—Philip E. Anderson
Attorney, Agent, or Firm—Cullen, Sloman, Cantor, Grauer, Scott & Rutherford

[57] ABSTRACT

The apparatus molds during each cycle homogeneous plastic material and foam plastic material. It includes a barrel member, a main passageway therein in which is located the screw member. A pair of injecting means for filling molds are provided, one having a homogeneous plastic injection chamber and the other having a foam plastic injection chamber. The first injection means is connected to the screw and barrel member upstream of the place where the inert fluid is introduced into the main passageway whereby homogeneous plastic material is discharged from the main passageway into the first injection means. The apparatus includes means for introducing an inert fluid into the main passageway whereby the rotating screw member mixes the gas with the molten plastic as it moves towards the discharge port which is connected to the second injection means whereby foam plastic material is injected into the foam plastic injection chamber. Each injection means has one or more nozzles connected to a mold located in a press. The molds for both the homogeneous and foam plastics material may be located in different presses or in the same press so that upon each cycle of the screw and barrel assembly and after both injection means have injected the plastic materials into the respective molds, the press or presses close and form the homogeneous plastic parts and the foam plastic parts. The several injection means or devices may be operated simultaneously or sequentially. Thus, it is possible to mold and form homogeneous and foam plastic parts during the same cycle using only one screw member.

19 Claims, 6 Drawing Figures

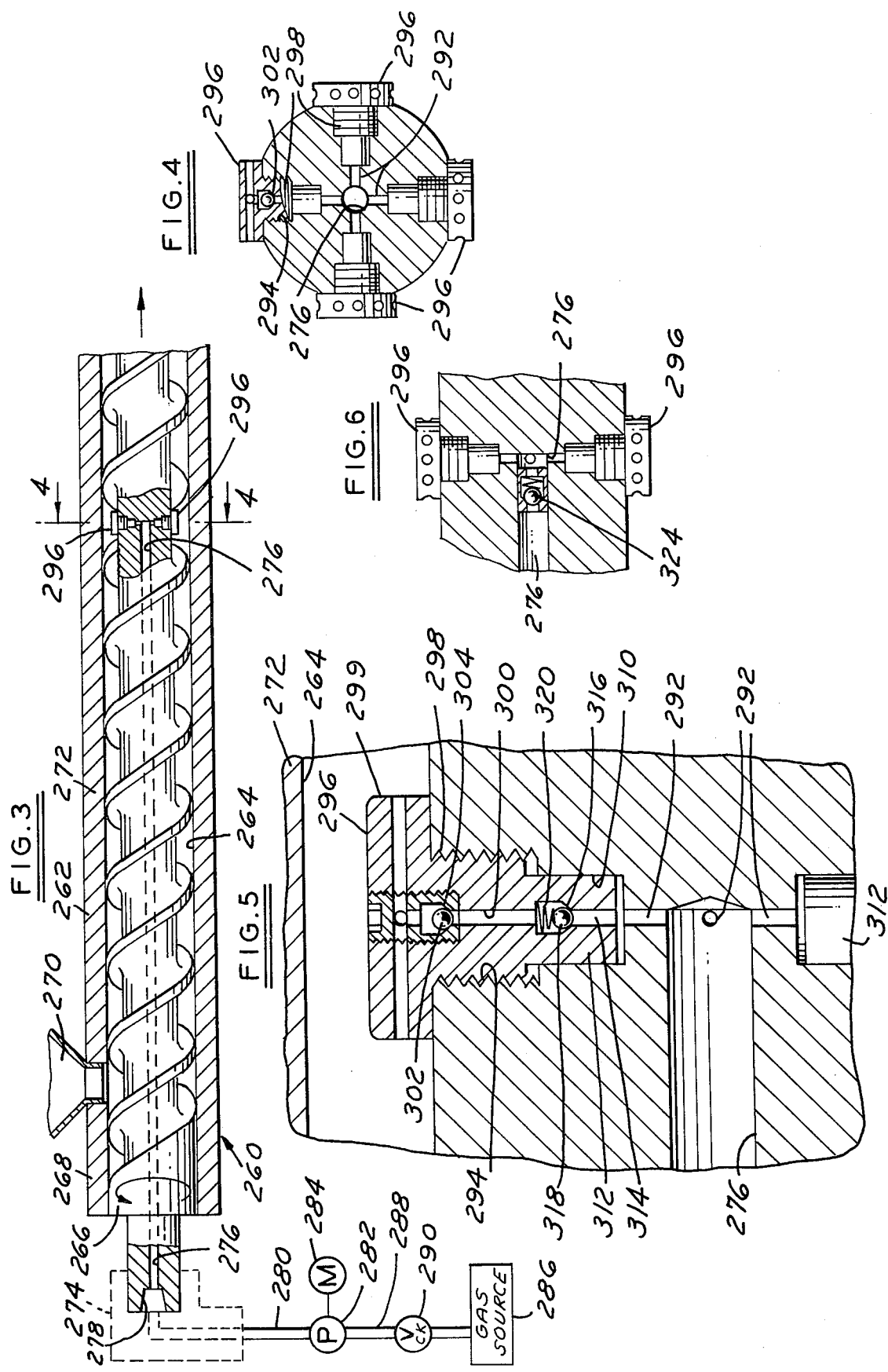

APPARATUS FOR INJECTION MOLDING OF PARTS FROM FOAM PLASTICS MATERIAL AND/OR FROM SOLID PLASTICS MATERIAL

BACKGROUND OF THE INVENTION

1. Field of the Invention

This invention relates to an apparatus for injection molding of parts from foam plastics material and/or from homogeneous plastics material. When foam plastics material is required, an inert gas is injected into the melt zone of the screw and barrel assembly under high pressure and the separate bubbles formed are mixed with the molten plastics material as a result of the rotation of the screw member in the barrel member to form the foam plastics material.

2. Description of the Prior Art

Industry has recognized for many years the advantages of utilizing parts made from foam plastics material as well as from homogeneous plastics material. A variety of methods and machines for forming and molding plastics material, with or without a foaming agent, have been utilized. The advantages of foam plastics material include strength, light weight, economy and the surface characteristics of the foam plastic parts. In the past, when a foam plastic part is used with a homogeneous plastic part, it has been the common practice to manufacture the foam plastic parts separately from the homogeneous plastic parts through separate injection devices and apparatuses, even using separate presses to mold the homogeneous parts and the foam plastic parts. This is expensive and often results in an over or an under count of one part relative to the other.

It has also been the common practice to operate the screw and barrel member of the extruder intermittently thus creating technical and maintenance problems in the manner in which the gas is introduced and mixed with the molten plastics material in the extruder. In certain instances where gas emitting fluids or gas emitted solid materials are premixed with plastic pellets, such operations are expensive not only due to the cost of the gas emitting materials but also due to the cost of the premixing procedures. Finally, the manner in which the gas is introduced into the molten plastics material has in the past resulted in many maintenance problems which can be corrected or minimized if the screw member is operated continuously as proposed herein.

In the prior art when the extruder or screw member is operated intermittently and stops it behaves like a coil spring in that it tends to rotate backward and the plastics material wants to backflow. As this occurs, the pressure in the extruder drops with the result that the inert gas forms a very large bubble in the main passageway so that when the extruder or screw member is restarted, it is necessary to break the bubble and whip it into the plastic material. This is difficult to achieve on an ongoing basis. Also it has been found that the molten plastics material will tend to clog the conduits or passages in which the inert gas is delivered to the main passageway of the screw and barrel members upon intermittent operation thereof. Such problems tend to reduce the quality of the foam plastics parts and the quantity of parts manufactured in a given time period. It further adds to the costs of manufacture and to the maintenance problems of the manufacturer.

BRIEF SUMMARY OF THE INVENTION

Thus the features of the present invention are:

(1) To provide a unique method, system and apparatus adapted for molding homogeneous and foamed plastic parts during the same cycle of operation of the apparatus, using only one screw member or plasticizer.

(2) To provide an apparatus for creating during each cycle of operation of the single screw member homogeneous plastics material and foamed plastics material, with each material directed to an injection device having a nozzle connected to a mold located in a press. The molds for both the homogeneous and foam plastics material may be located in different presses or in the same press so that upon each cycle of operation of the screw and barrel assembly and after both molds have been injected, the press or presses close to form the homogeneous plastic parts and the foam plastics parts. The several injection devices may be operated simultaneously or sequentially.

(3) To provide an apparatus, system and method which will operate on a continuous basis thereby avoiding continuous shut downs and intermittent stoppings of the apparatus which has heretofore resulted in voids in the foam plastics material of variable sizes and in large gas bubbles.

(4) To provide an apparatus, system and method of injecting gas into a stream of molten plastics or thermoplastics material by introducing same through an elongated passageway provided within the screw member or plasticizer, with the discharge end thereof being located in the melt zone of the apparatus. One or more radial passages are provided in the screw member in communication with the elongated screw passage, with each radial passage provided with one or more check valves for insuring that the molten plastics material does not get into the inert gas line or passage when the gas pump has been de-energized and to further prevent the inert gas from entering the main passageway and creating a large gas bubble or bubbles which interfere with the effective mixing of the molten plastics material when the pump is subsequently reenergized.

(5) To provide an efficient apparatus of relatively simple construction which will create and deliver solid plastics material and/or foam plastics material having voids which are uniform in size and distributed generally evenly throughout the foam plastics material.

(6) To provide an apparatus and method which will involve minimum maintenance and cost when providing modifications to the apparatus to meet a wide variety of industry's demands.

(7) To provide apparatuses which are economical in construction, efficient in operation, easy to maintain and are cost effective in operation.

BRIEF DESCRIPTION OF THE DRAWINGS

FIG. 3 is a fragmentary sectional view of a screw and barrel assembly, with the screw having an elongated longitudinally extending gas passage therein terminating in one or more radial gas discharge passages for directing the gas into the melt zone of the screw and barrel assembly;

FIG. 4 is a sectional view taken on generally the line 4—4 of FIG. 3;

FIG. 5 is a fragmentary sectional view of a modification of the screw and barrel assembly illustrated in FIGS. 3 and 4, with each radial screw passage being provided with a pair of check valves; and FIG. 6 is a fragmentary sectional view of the modified screw and barrel assembly shown in FIG. 5 and illustrating another check valve provided in the longitudinally extending screw passage.

DETAILED DESCRIPTION OF THE PREFERRED EMBODIMENTS

Figure 1:
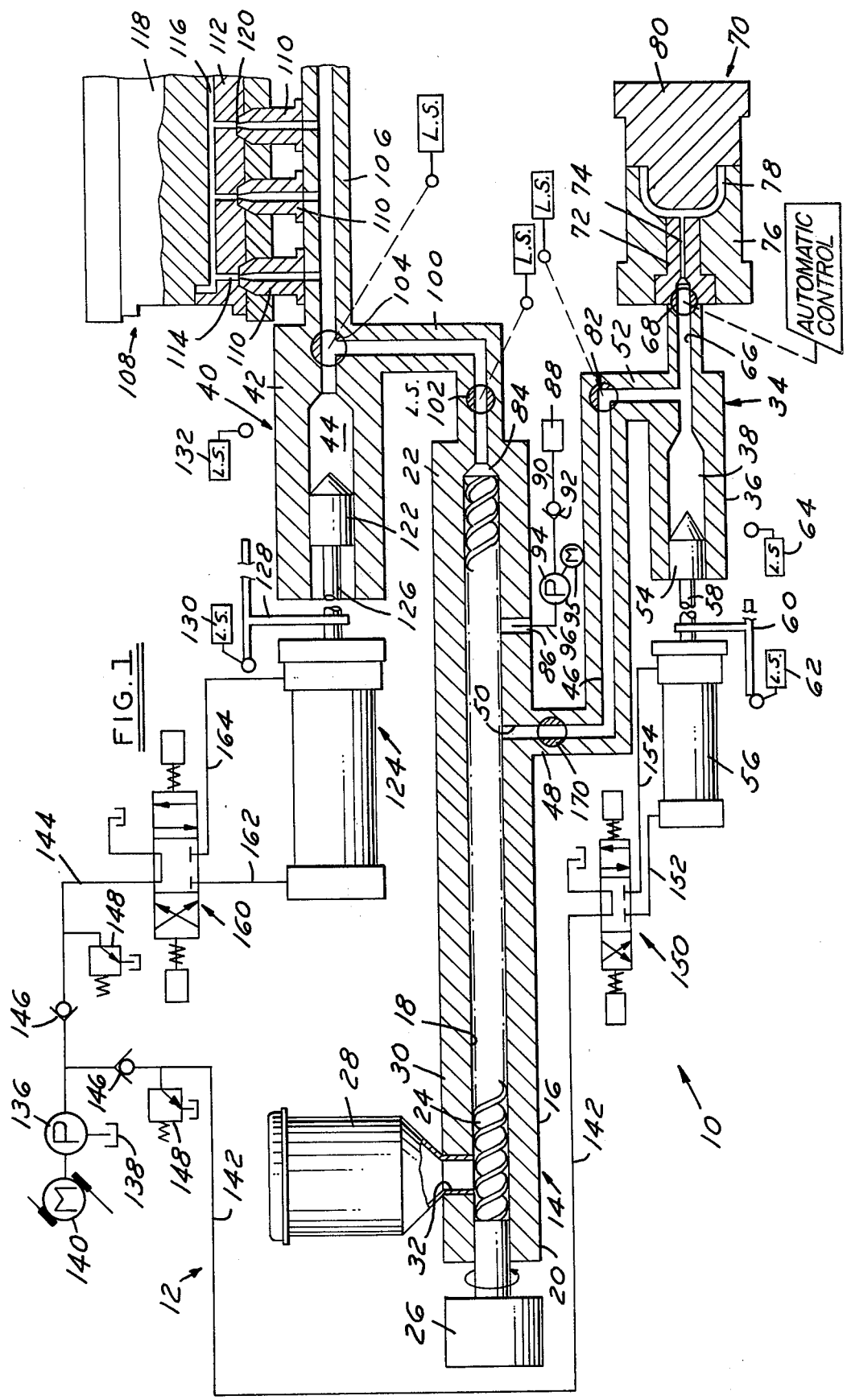
FIG. 1 is a schematic view of the apparatus and hydraulic circuit, with the apparatus having nozzles associated with molds which may be mounted in the same or in a different press, capable of forming homogeneous plastic parts and foam plastic parts.

FIG. 1 illustrates an apparatus and method utilizing various operational steps in the process of plasticizing or melting plastic or thermoplastic material in a screw and barrel assembly, while drawing from the screw and barrel assembly at one discharge port homogeneous plastics material and at the other discharge port foam plastics material. The apparatus and press can mold homogeneous and foamed plastic parts during the same cycle using only one screw member or plasticizer.

The apparatus 10 has a hydraulic circuit 12 and includes an extruder 14 in the form of an elongated barrel member 16 having an elongated chamber or main passageway 18 therein extending from one end 20 of the barrel member 16 to the other or forward end 22. An elongated screw member 24 is located within the main passageway or chamber 18 and is rotated therein by drive means 26 of any conventional type as is well known in the art. A hopper 28 containing solid or homogeneous plastic pellets is mounted on the wall 30 of the extruder 14 and is connected to the main passageway 18 via the port or opening 32 provided in the wall 30 of the barrel 16 surrounding the main passageway 18. The solid or homogeneous plastic pellets are introduced into the heated main passageway 18 via the hopper 28 in a conventional manner well known in the art. The pellets are advanced towards the forward end 22 by the resistance heat on the barrel member 16, frictional heat generated by rotation of the screw member 24 and by the back flow across the flights of the screw which melt the pellets in what is referred to herein as the melt, melting or heating zone or area of the screw and barrel assembly.

The apparatus 10 includes a first injection means or device 34 including a housing 36 having therein a homogeneous plastics injection chamber 38.

The apparatus 10 further includes a second injection means or device 40 including a housing 42 having a foam plastics injection chamber 44.

A first passage or conduit or line 46 is connected on one end 48 to a discharge port 50 provided in the barrel member 16 at the melt zone of the main passageway 18 at a place between the end portions 20 and 22 of the main passageway 18 as shown. The passageway or conduit 46 is connected on the other end 52 to the housing 36 and communicates with the homogeneous plastic injection chamber 38.

The first injection device 34 includes a plunger 54 which is located within the homogeneous plastics injection chamber 38. The plunger 54 is mechanically connected to a double acting fluid responsive piston and cylinder device 56 which has a piston rod 58 attached to the plunger 54 for operating same and to thereby store or discharge the homogeneous plastics material from chamber 38. The double acting fluid responsive cylinder device 56 is connected in the hydraulic circuit 12 as will be hereinafter described. The piston rod 58 carries a limit switch actuator or arm 60, which is designed to operate the limit switches 62 and 64 as will be hereinafter described.

The first injection device 34 includes a nozzle 66 having therein an injection nozzle valve 68. The nozzle 66 is associated with the mold assembly 70. Specifically, the mold nozzle 66 is received in the sprue bushing 72 having the sprue or passage 74 located in one mold part 76 of the assembly 70, with the sprue passage 74 leading to the cavity 78 within the interior of the mold assembly 70 formed by the cooperation of the other mold part 80 with the first mold part 76. The first injection device 34 may be utilized with one or any number of nozzles or gates, with only one nozzle being illustrated for simplicity purposes. The mold assembly 70 could include a distribution manifold by which the solid plastics material from the extruder 14 is directed into a plurality of nozzles for supplying the mold assembly from a plurality of gates. Such would be conventional design for supplying relatively large mold assemblies. If the apparatus is used for filling molds of relatively smaller size, a fewer number of gates or nozzles leading to the mold assembly would be provided.

Referring once again to FIG. 1, line 46 is connected to the screw and barrel assembly at a point where complete melting of the plastic pellets occur. Thus a portion of the molten plastics material is directed through the discharge port 50, passage or line 46, across the multi-directional homogeneous injection flow valve 82 provided in line 46 and controlled by a limit switch as will subsequently appear, to the homogeneous plastics injection chamber 38 where the homogeneous plastics material is stored in a measured amount equal to the weight of the part to be molded in the mold assembly 70. When the measured amount of homogeneous plastics material is accumulated, as determined by the limit switch setting, the valve 82 is closed.

Simultaneously with the above described operational steps, the molten plastics material continues advancing along the screw member 24 from barrel port 50 towards the other end 22 of the barrel member 16 where a second discharge port 84 is located. However as the molten plastics advances along the screw 24, a gas emitting or producing agent, in solid, liquid or gas form is introduced into the main passageway 18 downstream of the solid plastics discharge port 50 in the zone or area of the extruder 14 referred to herein as the melt and gas mixing zone of the main passageway 18.

Thus the apparatus 10 has a gas injection port 86 provided in the barrel wall 30 downstream of discharge port 50. A source of a gas emitting liquid or a source of an inert gas 88 is connected by a line 90 having a check valve 92 therein to the suction side of a gas or liquid pump 94, diagrammatically shown. The discharge or pressure side of pump 94 is connected by a hose, line or conduit 96 to the gas port 86. Any number of inert gases may be used, with nitrogen gas being the one conventionally utilized in the art. Thus as the molten plastics material advances past the gas port 86, it is injected with a series of small gas bubbles which mixes with the molten plastics material introduced therein by the variable volume liquid or gas pump 94. This occurs in the melt and gas mixing zone of the extruder and results in a generally uniform mixture of gas and plastic material being moved through the second discharge port 84. The gas is introduced under high pressure.

The second injection device 40 is connected to the discharge port 84 of the extruder 14 by a line, conduit or manifold passage 100. A limit switch controlled extruder or directional control valve 102 is provided in line 100. The line or passage 100 leads to the housing 42 having the foam plastics chamber 44 therein, with a limit switch controlled multi-position control valve 104 being provided in passage 100 to direct plastics flow first into the chamber 44 and then, when the foam plastics material is ejected from chamber 44, into the second mold assembly 108 for making foam plastics material parts.

The housing 42 of the second injection means or device 40 has a manifold line, conduit or passage 106 connected thereto by a plurality of mold injection nozzles 110 to the mold assembly 108 which forms the structural foam plastic parts. The mold assembly 108 includes a lower mold part 112 having therein a plurality of sprues or passages 114 aligned with the nozzles 110, with the sprues 114 leading from the injection nozzles to mold a cavity 116 provided by the lower mold part 112 and the upper mold part 118. Each nozzle 110 is provided with restricted passages or flow valves 120, as is conventional in the art, which cooperate with the sprues 114 provided in the mold 108. It should be appreciated that the mold assembly 108 just described may have a suitable distribution manifold by which foam plastic material from line or conduit 106 is directed into the plurality of nozzles 110 for supplying the mold 108 in a conventional manner. It should further be understood that the injection device 40 may be used with large molds as well as with relatively small molds, with the conduit or line 106 communicating through a fewer number of gates, as an example, one gate with the mold required to produce the part.

Located within the interior of the second plastic injection device 40 is a plunger 122 which is controlled by a fluid responsive double acting piston and cylinder device 124. The device 124 includes a piston rod 126 connected to the plunger 122. A limit switch actuator or arm 128 is carried by the piston rod 126 and is adapted to operate first one and then the other of the limit switches 130, 132 to fill the chamber 44 with a measured amount of the material corresponding generally to the molded weight of the part to be formed and thereafter to eject same from the chamber 44. The fluid responsive cylinder 124 is interconnected in the hydraulic circuit 12 as will subsequently be described.

Therefore, after the inert gas has been mixed with the plastic material in the melting and mixing zone of the extruder to foam plastics material is discharged through the port 84 and when the valves 102 and 104 are open such material is directed in a measured amount into the foam plastic injection chamber 44. At such time the valve 104 prevents the material from being directed into the conduit or manifold 106 which leads to the mold assembly 108. Again as in the case of the first injection device 34 when the desired volume or weight of foam plastic material is accumulated within the chamber 44 through the limit switch setting of the valve 102, the latter mentioned valve 102 closes. As a result thereof, the rotating screw member 24 stops rotating and the variable liquid or gas pump 94 is also de-energized and stops.

When both mold assemblies 70 and 108 for the homogeneous and foam plastics materials are ready to be filled, valves 104 and 68 are open discharging, in the case of the foam injection chamber 44, with action of the fluid responsive cylinder 124, the mixture of the gas and plastic foam material contained within chamber 44 and directing same into the foam mold assembly 108. Simultaneously or sequentially the fluid responsive cylinder 56 is actuated so as to move the plunger 54 to the right as viewed in FIG. 1 to discharge the homogeneous plastic material therefrom and to inject same into the mold cavity 78 to produce a homogeneous plastic part.

The mold assemblies 70 and 108 may be located in a single press or each may be located in a separate press; however, with the construction heretofore described, with each extruder cycle one homogeneous plastic part and one foam plastic part are produced.

The hydraulic circuit 12 for the apparatus 10 includes a hydraulic pump 136 having a reservoir or tank 138. The pump 136 is driven by an electric motor 140. The hydraulic circuit 12 includes a pair of passages or conduits 142 and 144, each being connected to the discharge side of the pump 136. Each passage 142, 144 contains a check valve 146 and safety pressure relief valve 148. Automatic controls are provided for operating the extruder 14 intermittently.

Included within the hydraulic circuit 12 and in particular in passage or conduit 142 is a four-way solenoid operated directional control valve 150 which is in turn connected by a pair of hydraulic conduits 152 and 154 to opposite ends of the double acting hydraulic piston and cylinder device 56. The conduit 142 may be connected through valve 150 to the either the tank or reservoir 138 or to one or the other ends of the hydraulic cylinder 56 as diagrammatically illustrated.

The passage or conduit 144 also contains a four-way solenoid operated directional control valve 160. Thus, hydraulic fluid in line 144 may be directed through the valve 160 to tank 138 or to one of the other ends of the hydraulic cylinder 124 in generally the same manner as has been explained previously in connection with cylinder 56. Thus, one pressure port of valve 160 is connected by line 162 to one end of the cylinder 124 while the other pressure port is connected by line 164 to the other end of the cylinder 124 as viewed in FIG. 1.

When it is required to replenish the homogeneous plastic chamber 38 the limit switch controlled valve 82 automatically opens to connect the passage or melt pipe 48 and chamber 38 with the first discharge port 50 of the extruder 14 to supply homogeneous plastics material to chamber 38. At such time the hydraulically actuated plunger 54 is moved to the left as viewed in FIG. 1 creating an expanding chamber 38 until actuator arm 60 trips limit switch 62 which signals that the required amount or weight of homogeneous plastics material has entered chamber 38. Thus the actuation of switch 62 is effective to close valve 82 indicating that a measured amount of solid plastics material is in chamber 38.

Simultaneously, the screw member 24 is discharging foam plastics material from the barrel via port 84 into chamber 44 through limit switch controlled valves 102 and 104. The hydraulically actuated plunger 122 is moved to the left as viewed in FIG. 1, expanding chamber 44, until the actuator or arm 128 trips limit switch 130 indicating the measured capacity of foam plastics material has been reached in chamber 44 and closing the limit switch controlled valves 104 and 102. Thereafter both the screw drive mechanism 26 and the pump 94 are automatically stopped and everything goes to zero.

When the mold assemblies 70 and 108 are ready to accept the plastics materials the valve 104 is automatically turned to a different position. Hydraulic fluid in line 162 is effective to move the plunger 122 to the right as viewed in FIG. 1 to drive the foam plastics material across valve 104 and nozzles 110 into the cavity 116 or mold 108. At such time actuator arm 128 trips limit switch 132 for a purpose which will subsequently be described. Simultaneously or sequentially nozzle valve 68 opens automatically and hydraulic fluid in line 152 drives the plunger 54 to the right as viewed in FIG. 1 through nozzle 66 into cavity 78 of the mold assembly 70. At the end of the stroke actuator or arm 60 trips limit switch 64 to complete the cycle of filling the molds.

The plastic parts formed in the press or presses are removed from the mold assemblies 70 and 108 in a conventional manner.

After the above described operation has been completed or, as an example, five or ten seconds later, the previously actuated limit switches 132 and 64 signal the screw drive mechanism 26 and the pump drive means 95 for the pump 94 to restart or to begin operating and start another cycle for making a homogeneous plastics part and a foam plastics part using the single screw member 24.

The screw drive mechanism 26 and the pump drive means 95 are operated by conventional means including the limit switches 62, 64, 130 and 132. Thus, after both expanding cylinders 38, 44 have been filled to the required volume or weight, the actuator or switch arms will strike the limit switches 62 and 130 and stop the operation of the drive mechanism 26 and the pump drive means 95. As the plungers 54, 122 move to expel plastics material from their respective chambers 38, 44 and to direct it to the mold assemblies 70, 108, the limit switches 64 and 132 are actuated to restart the drive mechanism 26 and the pump drive means 95. The screw limit switches can control stopping and starting of the screw drive mechanism 26 as is conventional in the art and this includes the use of conventional electrical relay circuits. Also the pump limit switches can control stopping and starting of the pump drive means 95 through conventional electrical relay circuits. Since it requires slightly more time to stop the screw member 24, as well as to start it, than to start or to stop the pump 94, the limit switch causing the screw drive means 26 to stop will be actuated a short time period before the limit switch causing the pump drive means 95 to stop and for the same reason the limit switch causing the screw drive means 26 to start will be actuated slightly ahead or before the limit switch causing the pump drive means 95 to start. The order in which the aforementioned drive means or mechanisms are energized and/or deenergized (start and/or stop), and the time lag caused therebetween may be selected as required since such order of selection are matters of individual adjustments and operating conditions.

Thus it appears that the hydraulic circuit 12 is provided with a pump 136 and reservoir 138 to operate the first and second injection devices 34 and 40 either simultaneously or sequentially. Such ejection devices each includes a plunger within the respective injection chamber and a double acting piston and cylinder device (56,124) connected to each plunger for filling the chamber and discharging the plastic material therein. A solenoid operated four-way directional flow control valve (150, 160) is provided for each of the piston and cylinder devices (56, 124) in the hydraulic circuit 12 for delivering hydraulic fluid to and from the respective ends of the cylinder to control the filling and discharging of the plastics material from the respective chambers.

In the event that only foam plastic parts are required, a shut off valve or control means 170 may be provided in the melt pipe or first passage means 48 adjacent the port 50 for closing same thereby preventing flow of homogeneous plastics material to the first injection means 34 and for rendering the injection device 34 temporarily inoperative.

The apparatus 10 may be modified to operate continuously rather than intermittently by adding thereto a plastic holding or storage chamber having a plunger and cylinder as will be hereinafter described in connection with the apparatus of FIG. 2.

Figure 2:
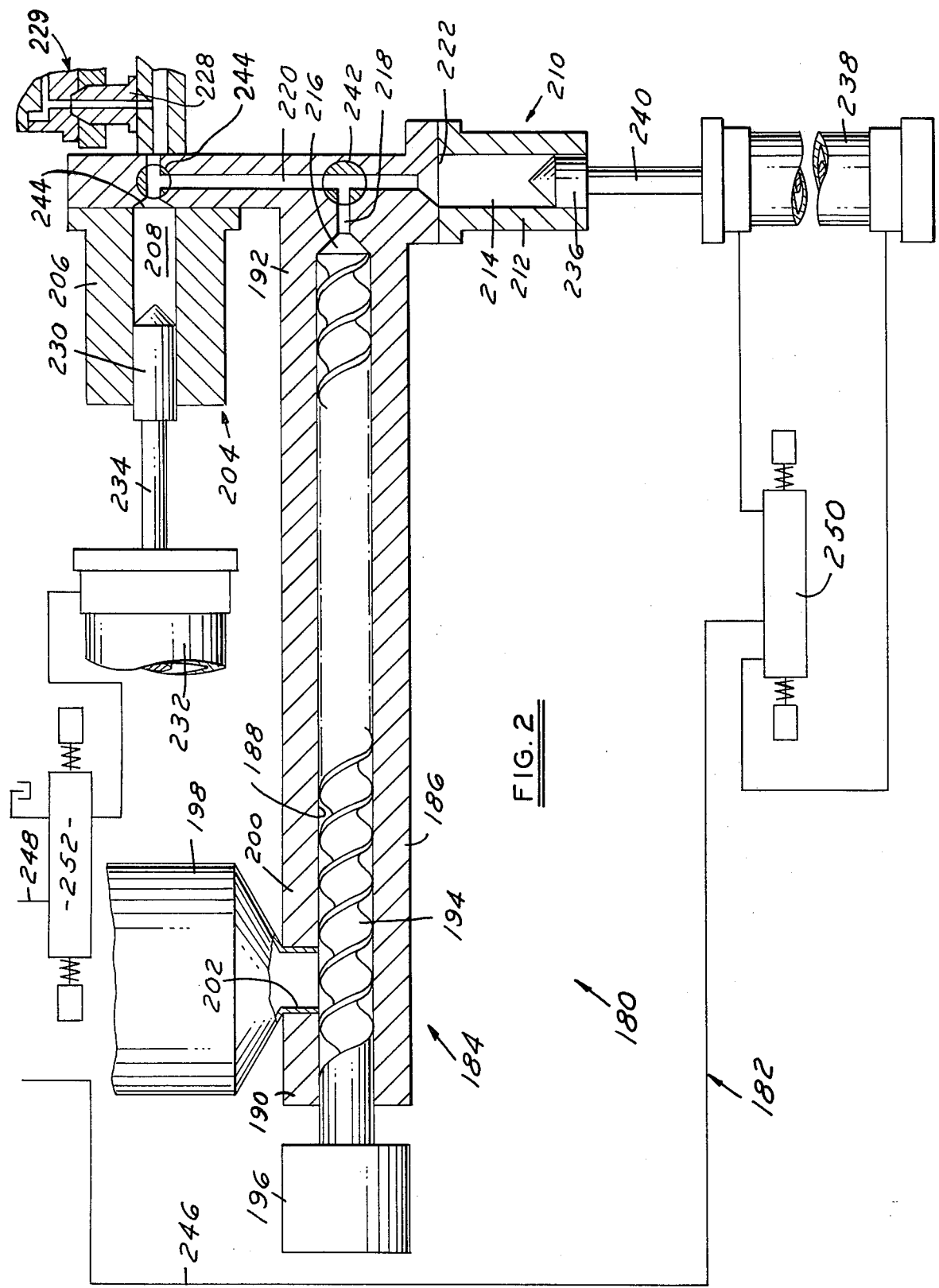
FIG. 2 is a fragmentary schematic view of another apparatus for extruding plastic parts, either foam or homogeneous, which is operated on a continuous basis, with the hydraulic circuit for operating same being fragmentarily shown.

A continuous operating apparatus 180 is shown in FIG. 2 and is capable of continuously forming molten foam plastics material for making structural foam parts in one or more molds located in a press. The apparatus 180 is also capable of delivering homogeneous plastics material rather than mixing such plastics material with a foaming agent.

There are many advantages for operating the apparatus 180 on a continuous basis. First, the pressurized inert gas and molten plastics material are evenly mixed, with the gas bubbles distributed uniformly throughout the foam plastics material. Thus the density of the foam material is improved and is uniform. Second, the problem of "gas puddling" in the main passageway is eliminated. In addition, the problem of breaking up large bubbles of gas in the main passageway of the apparatus, created when the extruder or apparatus is stopped, is minimized. Fourth, time is not required in having to continuously restart the gas pump and the screw drive mechanism. Thus increased production of high quality products or parts of uniform density result. Additional economic savings could result from lower production costs and lower maintenance costs.

The apparatus 180 has a hydraulic circuit 182 and includes an extruder 184 in the form of an elongated barrel member 186 having an elongated chamber or main passageway 188 therein extending from one end 190 of the barrel member 186 to the other or forward end 192. An elongated screw member 194 is located within the main passageway or chamber 188 and is rotated therein by conventional drive means 196. A hopper 198 containing homogeneous plastic pellets is mounted on the wall 200 of the extruder 184 and is connected to the main passageway 188 via the port or opening 202 provided in the wall 200 of the barrel 186 surrounding the main passageway 188. The plastic pellets are introduced into the heated main passage 188 via the hopper 198 in a conventional manner. A liquid blowing agent may be introduced into the hopper 198 as is known in the art or a nitrogen or inert gas may be pumped into the passageway 188 as shown in the apparatus of FIG. 1. The pellets are advanced towards the forward end 192 by the resistance heat on the barrel member 186, frictional heat generated by rotation of the screw member 194 and by the back flow across the flights of the screw 194 which melt the pellets. After melting, the gas mixes with the molten plastics material in the melting-mixing zone or area of the screw and barrel assembly. The inert gas under pressure is evenly mixed throughout the molten plastics material. The continuously rotating screw member 194 results in an even flow of the gas and plastics materials.

The apparatus 180 includes an injection means or device 204 including a housing 206 having therein a foam plastics injection chamber 208. While only one injection device 204 is shown, it should be understood that a plurality of devices 204 may be used.

The apparatus 180 further includes a plastic storage means or device 210 including a housing 212 having a foam plastics storage chamber 214.

The screw and barrel extruder 184 has a discharge port 216 which is connected by a passage 218 to an intermediate portion of a manifold, conduit, or line 220 as shown in FIG. 2. Conduit 220 connects the discharge port or end 222 of the storage chamber 214 with the port 226 of the injection cylinder 208.

Each injection device 204 is provided with one or more injection nozzles 228 provided with a valve leading to a corresponding mold assembly 229.

The injection device 204 includes a plunger 230 which is located within the foam plastics injection chamber 208. The plunger 230 is mechanically connected to a double acting fluid responsive piston and cylinder device 232 which has a piston rod 234 attached to the plunger 230 for operating same and to thereby store or discharge the foam plastics material from chamber 208. The double acting fluid responsive cylinder device 232 is connected in the hydraulic circuit 182.

Located within the interior of the plastic storage device 210 is a plunger 236 which is controlled by a fluid responsive double acting piston and cylinder device 238. The device 238 includes a piston rod 240 connected to the plunger 236. The fluid responsive cylinder 238 is also intereconnected to the hydraulic circuit 182.

An automatically operated multi-directional plastic flow valve 242 is located in the conduit 220 for controlling the flow of the molten foam plastics material from extruder discharge port 216 and line 218 to either the injection chamber 208 or to the storage chamber 214 in a phased or timed sequence resulting in a continuous flow of plastic material. Another automatically operated multi-directional injection plastic flow valve 244 is located in line 220 to direct plastic flow into injection chamber 208 and thereafter to direct the pressurized foam plastic material from chamber 208 to the mold, not shown, through the valve nozzle 228 in a predetermined timed sequence of operation.

In operation, as soon as the mold assembly or assemblies is ready to receive the foam plastics material from the injection chamber 208, the valve nozzle 228 automatically opens, the plastic flow valve 244 automatically shifts, and the fluid operated cylinder 232 is automatically energized to move the plunger 230 to the right as viewed in FIG. 2 thereby directing the foam plastics material across valve 244 and through the open nozzle 228 to the mold assembly 229.

Simultaneously the foam plastics material from extruder 184 is prevented by valves 244 and 242 from entering injection chamber 208 and as a result thereof the material is automatically directed by valve 242 to the storage chamber 214 where the foam plastics material is stored. When the mold is ready to accept additional foam plastics material, valves 242 and 244 automatically shift, and the fluid actuated cylinder 238 is automatically energized to drive the stored plastics material from chamber 214 towards chamber 208 where the material is supplemented by the foam plastics material being continuously discharged via the port 216 aforesaid. The speeds of the screw member 194 and cylinders 232 and 238 may be automatically controlled and adjusted to permit continuous flowing of the foam plastic material.

The hydraulic circuit 182 is similar to the circuit 12 of FIG. 1 and includes a hydraulic pump, reservoir, relief and check valves, not shown. The circuit 182 has a pair of conduits 246, 248, each containing a solenoid operated four-way hydraulic directional flow control valve 250, 252 respectively connected by hydraulic lines to the fluid operated piston and cylinder devices 238 and 232. The hydraulic circuit 182 operates and functions in generally the same manner as hydraulic circuit 12. Automatic controls, limit switches, electrical relay and timing circuits and speed controls, not shown, are provided for achieving the continuous extrusion or plasticizing process just described.

The apparatus 180 may also use the gas delivery system as disclosed in FIG. 1 including the barrel port 86, gas source 88, check valve 92, pump 94, pump driving means 95 and conduits 90 and 96. The pump 94 may be a constant displacement or delivery pump which delivers a predetermined quantity of gas bubbles in the molten plastics material during each cycle of pump operation. As an example, a diaphragm or piston pump may be used.

The screw and barrel construction shown in FIGS. 3-6 inclusive may be used with the intermittently operated extruder apparatus 10 of FIG. 1 or with the continuously operated apparatus 180 of FIG. 2. Such structure includes a novel way of introducing the inert gas, such as nitrogen, into the gas-melt zone of the extruder and has certain advantages over the prior art as indicated in the Brief Summary Of The Invention.

The extruder or apparatus 260 is for extruding foam plastics material. It has an elongated tubular barrel member 262 having an elongated main passageway or chamber 264 therein. An elongated screw member 266 of special construction is located in and extends along the main passageway 264 from one end 268 of barrel 262 towards the other end where the conventional discharge port is located.

A hopper 270, with solid or homogeneous plastic pellets, is mounted on wall 272 of the barrel member 262. Drive means 274 is provided for rotating the screw member 266 in the barrel member 262 for heating and plasticating the plastics material while simultaneously causing the plastics material to advance through the main passageway 264 towards the discharge port located near the other end or end portion of the barrel member 262.

The screw member 266 is of novel construction in that it is provided with an elongated or longitudinally extending screw passage 276 extending from the leading or one end of the screw member towards the other end thereof.

The screw passage 276 has a threaded inlet 278 to which is rotatably attached one end of a conduit or hose 280. The other end of conduit 280 is connected to a pump 282 having the pump driving means 284. The pump 282 may be either a variable volume pump or a constant delivery pump. The suction side of the pump 282 is connected to a source of gas 286 by a conduit 288 having a check valve 290 therein. Thus the system just described provides means for introducing an inert gas into the melt-gas mixing zone of the main passageway 264 at a pump pressure of from 1500 to 6000 p.s.i.

The screw passage 276 terminates short of the opposite end of the screw 266 and intersects one or a plurality of radially extending gas discharge passages 292. Each radial discharge passage 292 is designed to introduce into the molten plastics material a continuous series of small gas bubbles at a uniform or variable rate depending on the pump and the requirements of the apparatus.

As illustrated in the drawing, four radial gas passages or ports 292 are provided in the screw 266. The areas or zones of the screw 266 where the passages 292 intersect the outer screw surface, are provided with threaded recesses 294 into which are threaded check valve plugs 296. Each plug 296 has a threaded stem 298 having a head 299 and provided with a passage 300 so that the gas bubbles from screw passage 276 can be discharged into the molten plastics material in the main passageway 264. The plug 296 has a ball check valve 302 and slot 304. When the pump 282 is operating the pressurized gas is directed by the pump 282 through conduit 280 and the elongated screw passage 276 where it emerges or exits therefrom into the barrel member 262 via the radial gas ports or passages 292 and the plug passages 300. The gas enters the molten plastics material and is uniformly mixed therewith as a result of the rotation of the screw member to form foam plastics material which is discharged from the barrel member 262 through the discharge port provided therein.

With such a construction each ball check valve 302 is held away from its seat 304 by the pressure of the gas as determined by the pump 282. The check valve 302 closes and seats against the set 304 when the pump 282 is deenergized to prevent the molten plastics material in the main passageway 264 from entering the radial and longitudinal gas passages 300, 292 and 276 provided in the plugs 296 and screw member 266. As indicated, the check valve plugs 296 are located in the melt zone of the extruder 260 in the area of decompression in the screw member 266.

The structure of FIGS. 5 and 6 is similar to the embodiment of FIGS. 3 and 4 in that the various screw passages both longitudinal (276) and radial (292) are utilized. In addition the check valve plugs 296 are provided which are also threaded into recesses 294 in the manner described earlier.

An additional feature of FIGS. 5 and 6 is the provision in each passage 292 of another recess 310 in the wall of the screw member 266 and in line with the threaded recess 294. An inner ball check plug 312 having a passage 314, ball seat 316, ball 318 and a biasing spring 320 is seated in recess 310 and permits flow of gas therethrough while the pump 282 is energized. When the gas flow stops, the spring 320 of each ball check plug 312 urges the ball 318 against the opposing seat 316. The purpose of the ball check plugs 312 is to prevent the inert or nitrogen gas from entering into the main passageway 264 after the extruder 260 has stopped thereby eliminating the creation of a large gas bubble or bubbles in the melt and gas mixing zone of the extruder.

Another ball check valve 324 may be provided in the longitudinal gas passage 276 near the radial passages or gas ports 276 as shown in FIG. 6.

Another advantage of the screw construction just described is that if the plastic material should get by the check valves, it will generally not harden since the screw member is heated and will keep the plastics material leaking into the gas line in a fluid condition. The possibility of check valve failures is minimized because of the location of the check valve in the heated screw.

I claim:

1. An apparatus for molding during each cycle of operation (a) homogeneous plastics material and (b) foamed plastics material, the combination comprising:
   a main passageway comprising a wall surrounding an extruding chamber and plasticizing means located in said main passageway for heating and plasticating a plastics material while simultaneously causing the plastics material to travel through said passageway from one end toward the other end thereof; said main passageway having a melt zone followed by a melt and gas mixing zone;
   first injection means including a homogeneous plastics injection chamber;
   second injection means including a foam plastics injection chamber;
   first passage means connected on one end to the melt zone of said main passageway at a place upstream of said melt and gas mixing zone of said main passageway, said first passage means being connected on the other end thereof to said homogeneous plastics injection chamber;
   a first flow control valve located in said first passage means, said first valve being opened during the time the homogeneous plastics injection chamber is being filled with homogeneous plastics material, and being closed after the measured amount of homogeneous plastics material has been stored in said homogeneous plastics injection chamber;
   second passage means connected on one end to the melt and gas mixing zone of said main passageway downstream of the connection of said first passage means to said main passageway, said second passage means being connected on the other end thereof to said foam plastics injection chamber;
   a second flow control valve located in said second passage means, said second valve being opened during the time the foam plastics injection chamber is being filled and being closed after the measured amount of foam plastics material has been stored in said foam plastics injection chamber;
   means for introducing a gas or a gas emitting liquid or solid into the melt and gas mixing zone of said main passageway intermediate the connections of said first and second passage means to said main passageway where the gas mixes with the molten plastics material to form foamed plastics material;
   means for energizing said plasticizing means and first directing the molten plastics material through said first passage means to said homogeneous plastics injection chamber for storing same in a measured amount generally corresponding to the molded weight of the homogeneous plastic part to be formed and second directing the molten foamed plastics material through said second passage means to said foam plastics injection chamber for storing same in a measured amount generally corresponding to the molded weight of the foamed plastic part to be foamed; and
   fluid operated means for energizing said first and second injection means to discharge the plastics materials from their respective injection chambers to the corresponding molds for forming homogeneous plastics parts and foamed plastics parts;

said fluid operated means including means for operating said first and second injection means either simultaneously or sequentially to respectively direct the homogeneous and foam plastics material to the corresponding molds to make the homogeneous plastic parts and the foam plastic parts.

2. The apparatus defined in claim 1 wherein said homogeneous plastics injection chamber has a discharge nozzle for delivering the homogeneous plastics material to the mold, said discharge nozzle having a nozzle valve therein which is closed during the time the homogeneous plastics injection chamber is being filled and is opened during the time said fluid operated means is energized to direct the stored homogeneous plastics materials to the mold through said discharge nozzle.

3. The apparatus defined in claim 1 wherein said foam plastics injection chamber has one or more injection discharge nozzles for delivering the foam plastics material stored therein to the corresponding mold for making structural foam plastic parts, and a multi-position nozzle valve located upstream of said discharge nozzle at the intersection of the discharge port of said foam plastics injection chamber and said other end of said second passage means, said multi-position nozzle valve having a first open position through which the foamed plastics material is directed into said foam plastics injection chamber and which blocks flow to said discharge nozzles; said multi-position nozzle valve having a second open position through which the foamed plastics material is ejected from said foam plastics injection chamber into the mold through the discharge nozzle and which prevents reverse flow of the foam plastics material through said second passage means towards said main passageway.

4. The apparatus defined in claim 3 wherein the means for introducing a gas or a gas emitting liquid into said main passageway includes a source of a gas or a gas emitting liquid, a variable volume liquid or gas pump having the suction side thereof connected to said source and drive means for energizing said pump and delivering the gas or gas emitting liquid to said main passageway for mixing with the molten plastics material in the melt and gas mixing zone downstream of the place where said first passage means is connected to said main passageway.

5. The apparatus defined in claim 1 wherein the means for introducing a gas into the melt and gas mixing zone of said main passageway includes a pump, a source of gas inert to said plastics material connected to the suction side of said pump, conduit means connecting the discharge side of said pump to said main passageway downstream of the place where said first passage means joins said main passageway and means for energizing said pump and delivering the inert gas to said main passageway for mixing by said plasticizing means with the molten plastics material to form foam plastics material.

6. The apparatus defined in claim 5 wherein said plasticizing means is an elongated screw positioned within and extending along the extruding chamber of said main passageway and said conduit means includes a longitudinally extending passage provided in said screw, said screw passage extending from one end of the screw towards the other end thereof, said screw including one or more radially extending gas discharge passages which communicate on the inner ends thereof with the screw longitudinally extending passage and a check valve in each radially extending passage which is opened when the gas is delivered by said pump into said melt and gas mixing zone of the main passageway and is closed when the cycle is completed and said pump is deenergized to prevent the molten plastics material from entering said conduit means including the radial and longitudinal passages in said screw.

7. The apparatus defined in claim 5 wherein said plasticating means is an elongated screw positioned within and extending along the extruding chamber of said main passageway, said conduit means including a longitudinally extending passage provided in said screw which extends from one end towards the other end thereof which it terminates in the melt-gas zone of the apparatus, said screw including one or more radially extending gas discharge passages which communicate on the inner ends thereof with the screw longitudinally extending passage and a pair of check valves in each screw radially extending gas discharge passage which are opened when the gas is delivered by said pump to said melt and gas mixing zone of the main passageway and are closed when the cycle has been completed and said pump is de-energized, one check valve of each radially extending gas discharge passage preventing the molten plastics material from the main passageway from entering the radial and longitudinal screw passages of said conduit means, and the other check valve of each radially extending gas discharge passage being resiliently biased for preventing the gas in the conduit means including said radial and longitudinal passages in said screw from entering said main passageway.

8. The apparatus defined in claim 6 wherein the longitudinal screw passage in said screw is provided with a check valve near the intersection of the screw passage with said radially extending gas discharge passages.

9. The apparatus defined in claim 7 wherein the longitudinal screw passage in said screw is provided with a check valve near the intersection of said screw passage with said radially extending gas discharge passages.

10. The apparatus defined in claim 1 for use with a single press containing the molds into which the plastics material is injected.

11. An apparatus for continuously extruding plastics material in either a homogeneous or foam condition and intermittently molding a plastic part in a mold assembly comprising:
an elongated tubular barrel member having an elongated main passageway therein;
said main passageway having a melt zone and/or a melt and gas mixing zone;
an elongated screw member located in and extending along said main passageway;
means for introducing plastics material into said barrel member at one end thereof;
means for rotating said screw member in said barrel member for heating and plasticating the plastics material while simultaneously causing the plastics material to advance through said passageway from said one end towards the discharge port at the other end thereof;
first injection means including a plastics injection chamber provided with an injection discharge nozzle;
second injection means including a temporary plastics storage chamber;
first conduit means connected on opposite ends thereof to said plastics injection chamber and to said temporary plastics storage chamber;

second conduit means connecting the discharge port of said screw and barrel members to said first conduit means;

a first multi-position flow control valve in said first conduit means for directing the molten plastics material to either said plastics injection chamber or to said temporary plastics storage chamber;

means for changing the flow directional positions of said first flow control valve upon the filling of either chamber with the molten plastics material and the discharging of the molten plastics material from the other chamber;

said rotating means for energizing said screw member directing the molten plastics material through said multi-position flow control valve to either of said plastics chambers depending on the position of said multi-position flow control valve;

fluid operated means for energizing said first injection means for discharging the plastics material from said plastics injection chamber through said injection discharge nozzle into the mold for making plastic parts;

said screw member, while said first injection means is injecting the plastics material through said discharge nozzle into the mold, continuing to advance the molten plastics material along the barrel member from where it is directed by said first multi-position flow control valve to said first conduit means and into said temporary plastics storage chamber;

said fluid operated means, after the molten plastics material has been discharged from said plastics injection chamber and after other plastics material has been stored in said other chamber, being energized to direct the stored plastics material from said temporary plastics storage chamber across said first multi-position valve and said first conduit means towards said plastics injection chamber;

said rotating means continuously advancing the molten plastics material along said screw member during the operation of either of said first and second injection means whereby the molten plastics material is directed to one or the other of the injection and storage chambers depending on the position of said first multi-position flow control valve;

and a plastic flow control valve located adjacent the injection discharge nozzle of said plastic injection chamber; said plastic flow control valve when in one position permitting the plastics material to enter the plastics injection chamber and blocking flow through said discharge nozzle; and said plastic flow control valve when in another position permitting said first injection means to inject the plastics material therein through said discharge nozzle while blocking flow in said first conduit means.

12. The apparatus defined in claim 11 wherein means are provided for introducing a gas or a gas emitting liquid into said melt and gas mixing zone of said main passageway, said last mentioned means including a source of a gas or a gas emitting liquid, a liquid or gas pump having the suction side thereof connected to said source, and drive means for energizing said pump and delivering the the gas or gas emitting liquid to the melt and gas mixing zone of said main passageway for mixing with the molten plastics material to form foam plastics material.

13. The apparatus defined in claim 11 wherein means are provided for introducing a gas into said melt and gas mixing zone of said main passageway, said last mentioned means including a pump, a source of gas inert to said plastics material connected to the suction side of said pump, third conduit means connecting the discharge side of said pump to the melt and gas mixing zone of said main passageway, and means for energizing said pump and delivering the inert gas to said main passageway for mixing by said screw member with the molten plastics material to form foam plastics material.

14. The apparatus defined in claim 13 wherein said third conduit means includes a longitudinally extending passage provided in said screw member, said screw passage extending from one end of the screw member towards the other end thereof, said screw including one or more radially extending gas discharge passages which communicate on the inner ends thereof with the longitudinally extending screw passage, and a check valve in each radially extending passage which is opened when the gas is delivered by said pump into the melt and gas mixing zone of said main passageway and is closed when said pump is de-energized to prevent the molten plastics material from entering said conduit means including the radial and longitudinal passages in said screw member.

15. The apparatus defined in claim 13 wherein said third conduit means includes a longitudinally extending passage provided in said screw member which extends from one end towards the other end thereof where it terminates in the melt and gas mixing zone of the apparatus, said screw member including one or more radially extending gas discharge passages which communicate on the inner ends thereof with the longitudinally extending screw passage, and a pair of check valves in each screw radially extending gas discharge passage which are opened when the gas is delivered by said pump to said main passageway and are closed when said pump is de-energized, one check valve of each radially extending gas discharge passage preventing the molten plastics material from the main passageway from entering the radial and longitudinal screw passages of said third conduit means, and the other check valve of each radially extending gas discharge passage being resiliently biased for preventing the gas in the third conduit means including said radial and longitudinal screw passages from entering said main passageway.

16. The apparatus defined in claim 14 wherein the longitudinal screw passage in said screw member is provided with a check valve near the intersection of the screw passage with said radially extending gas discharge passages.

17. The apparatus defined in claim 15 wherein the longitudinal screw passage in said screw member is provided with a check valve near the intersection of said screw passage with said radially extending gas discharge passages.

18. An apparatus for extruding foam plastics material comprising:
 an elongated tubular barrel member having an elongated main passageway therein;
 an elongated screw member located in and extending along said main passageway;
 means for introducing plastics material into said barrel member at one end thereof;
 means for rotating said screw member in said barrel member for heating and plasticating the plastics material while simultaneously causing the plastics material to advance through said passageway from said one end towards the discharge port at the other end thereof;

means for introducing an inert gas into the melt zone of said main passageway, said last mentioned means including;

an elongated passage extending from said one end of said screw member to the other end thereof where it communicates with said main passageway;

a pump;

a source of gas inert to said plastics material connected to the suction side of said pump;

means connecting the discharge side of said pump to the entrance to said screw passage at said one end of said screw member whereby the inert gas is directed by said pump through said elongated screw passage where it exits therefrom into said barrel member and from where it mixes with the molten plastics material as a result of the rotation of said screw member to form foam plastics material which is discharged from said barrel member through said discharge port;

said screw member including one or more radially extending gas discharge passages which communicate on the inner ends thereof with the longitudinally extending screw passage;

a pair of check valves in each radially extending gas discharge screw passage which are opened when the gas is delivered by said pump to said main passageway and are closed when said pump is de-energized, one check valve of each radially extending gas discharge passage preventing the molten plastics material from the main passageway from entering the radial and longitudinal screw passages, and the other check valve of each radially extending gas discharge passage being spring biased for preventing the gas in said radial and longitudinal screw passages from entering said main passageway.

19. The apparatus defined in claim 18 wherein the longitudinal screw passage in said screw member is provided with a check valve near the intersection of said screw passage with said radially extending gas discharge passages.

* * * * *